Jan. 24, 1933. L. W. CHUBB 1,894,979
VERNIER MOTOR
Filed Aug. 26, 1931  2 Sheets-Sheet 1

WITNESSES:

INVENTOR
Lewis W. Chubb.

BY
ATTORNEY

Jan. 24, 1933.  L. W. CHUBB  1,894,979
VERNIER MOTOR
Filed Aug. 26, 1931   2 Sheets-Sheet 2

WITNESSES:

INVENTOR
Lewis W. Chubb.
BY
ATTORNEY

Patented Jan. 24, 1933

1,894,979

UNITED STATES PATENT OFFICE

LEWIS W. CHUBB, OF PITTSBURGH, PENNSYLVANIA, ASSIGNOR TO WESTINGHOUSE ELECTRIC & MANUFACTURING COMPANY, A CORPORATION OF PENNSYLVANIA

VERNIER MOTOR

Application filed August 26, 1931. Serial No. 559,401.

My invention relates to a vernier motor for use either as a low-speed synchronous motor for clocks, phonographs, or the like, or as a magnetic reduction-gear unit for driving clocks, speedometers, submarines, or, in fact whenever a reduction gear is needed.

The object of my invention is to provide a simple and economical motor of the form described, the same being embodied either as a self-starting motor or as a non-self-starting motor.

Figure 1:
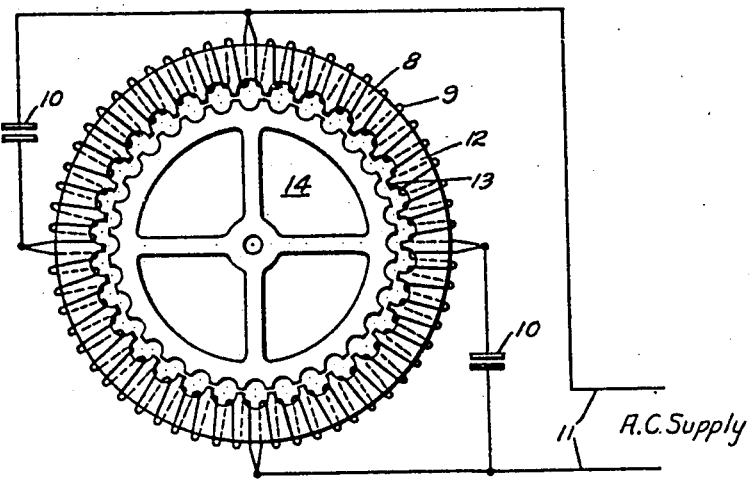
Figure 2:
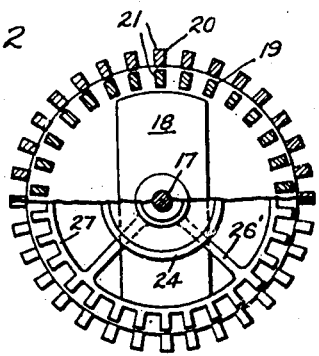
Figure 3:
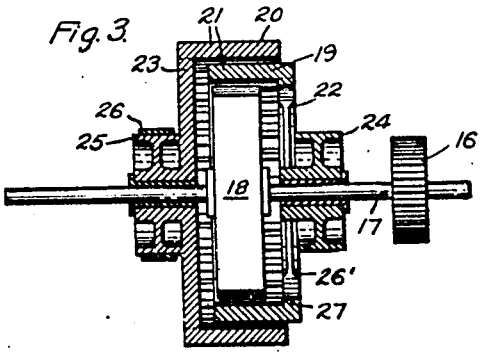
Figure 4:
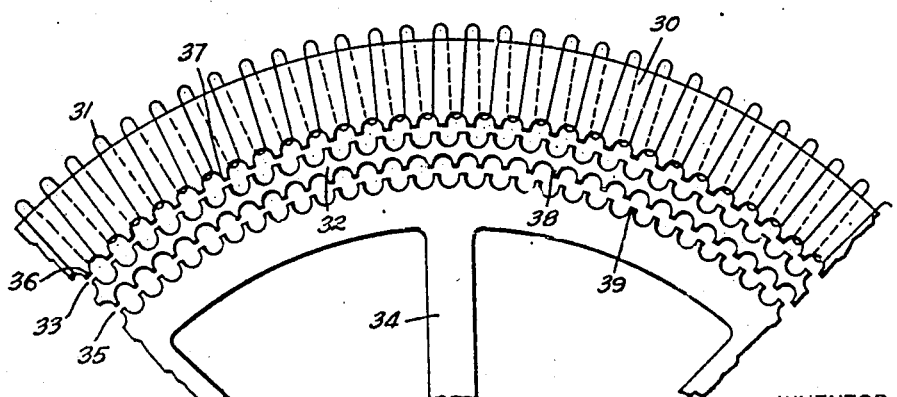
Figure 5:
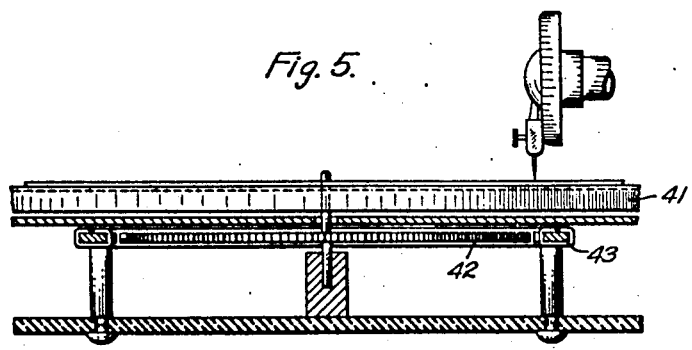
Figure 6:
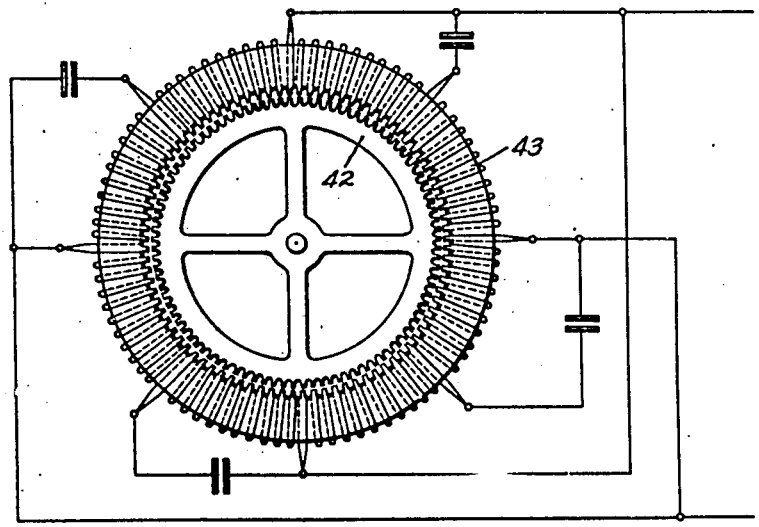
Figure 7:
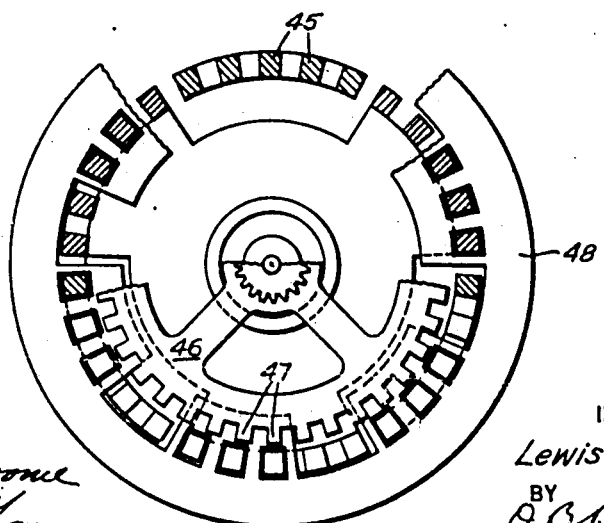

In the accompanying drawings,

Figure 1 is a plan view of a synchronous clock motor embodying my invention,

Figs. 2 and 3 are plan and longitudinal sectional views, respectively, of a magnetic reducing gear unit embodying my invention, Fig. 4 is a fragmentary plan view of a cascade vernier motor for effecting a double reduction in speed, as compared to the full synchronous speed of a two-pole motor, Fig. 5 is a vertical section of a phonograph motor embodying my invention, Fig. 6 is a plan view of the motor shown in Fig. 5, and Fig. 7 is a plan view of a multipolar synchronous clock motor, with parts broken away to show the construction.

Fig. 1 shows a stator 8 wound as a split-phase Gramme ring, the same having a two-pole winding 9, with a two-phase supply shown as being obtained by capacitors 10 in series with one of the phases of the winding 9, the whole being supplied from a single-phase source 11. The inside surface of the stator core 12 has thirty teeth 13. Cooperating with the stator member 8 is a rotor member comprising a magnetic core 14 without winding and having, in this case, thirty-two teeth.

On a 60-cycle supply, the stator winding will produce a rotating field making 3600 revolutions per minute. It will be noted that the teeth at the top and bottom of Fig. 1 are coincident, whereas those at the right and left are displaced approximately one-half of a tooth pitch. In the vertical positions, the radial gap reluctance will be low, and at the sides it will be high. As the field revolves, there will be a tendency for the coincidence of teeth to revolve with the field. In Fig. 1, this will mean that, for each revolution of the stator field, the rotor will move in the same direction, two complete rotor tooth-pitches. In the motor shown in Fig. 1, therefore, the rotor will turn at 225 revolutions per minute, and it will remain locked at this speed as a synchronous motor.

In Figs. 2 and 3 I have illustrated my invention as a magnetic reducing gear. This embodiment of the invention involves three relatively moving parts, any one of which may be held stationary, whereupon the other two parts will take up their definite speeds relative to the stationary part. In order to fix our ideas, and to facilitate the description, I shall assume that a motor or prime mover of some kind is driving a pulley or gear 16 which is fixed to a shaft 17 carrying a two-pole magnet 18 which may be either an electromagnet (of any number of poles) or, as shown, a permanent magnet. This magnet may be either on the outside, or, as shown, on the inside, as the rotor of a synchronous motor.

Surrounding the magnet 18 in Figs. 2 and 3 are two concentric spaced cylinders 19 and 20 of spaced, axially-extending magnetic poles or teeth 21, which may be conveniently formed by bending the teeth over from two magnetic disks 22 and 23, respectively. The shaft 17 of the permanent magnet rotor 18 is journalled in these disks 22 and 23.

The two disks 22 and 23 are shown as each having a pulley or gear wheel attached thereto, as indicated at 24 and 25, respectively. Ordinarily, one of these members will be held against rotation, as by means of a brake band 26 on the pulley 25, whereupon the other pulley 24 will rotate at a definite speed, depending upon the speed of the rotating magnet 18 and the relative numbers of teeth 19 and 20, as will now be described.

The teeth 19 and 20 of the magnetic reducing gear shown in Figs. 2 and 3 are designed upon the same vernier principle which is characteristic of all of the embodiments of my present invention. In a two-pole construction, as shown, the stator member will have two teeth more or less than the rotor member. In Figs. 2 and 3, the rotor member 19 is shown as having thirty teeth, whereas the stator member 20 has thirty-two teeth. As the magnetic field 18 rotates, the coincidence of teeth will follow the field, but since the rotor has less teeth than the stator, its rotation will be in the direction opposite to the rotation of the field. If the two-pole field member 18 rotates at 3600 revolutions per minute, the rotor member 19 will rotate backwardly at a synchronous speed of 240 revolutions per minute.

If the member 19 were held stationary and the member 20 permitted to rotate, while the two-pole field member still rotates at 3600 revolutions per minute, the rotating member 20 would rotate in the same direction as the field at $$\frac{32-30}{2} \times 3600 = 225 \text{ R. P. M.}$$

This same principle applies, whether the rotating field is produced electrically by a polyphase or shaded-pole winding or whether it is produced mechanically by a rotating magnet. In either case, the rotation of the slow-speed rotor or driven member may be either forward or backward, according as the rotor has two teeth more or two teeth less than the stator teeth. The speed of rotation is determined by the number of rotor teeth.

It will be understood that the embodiments of my invention shown in the drawings are intended more to show the principles of the invention rather than the specific design. In the reducing gear embodiment shown in Fig. 3, it is desirable that the inner cylindrical member 19, which is closest to the permanent magnet 18, shall be composed of teeth 21 which are magnetically insulated from each other, as well as possible, so that the flux from the ends of the permanent magnet 18 will pass directly through the teeth 21 of the inner cylinder 19, across the two air gaps, to the teeth 21 of the outer cylinder 20, whereupon the flux is returned from the north pole to the south pole, through the magnetic disk-like yoke 23 of the outer cylinder 20. To this end, the disk 22 of the inner cylinder 19 is cut away, in spider formation, as indicated at 26', so as to leave as small a rim 27, as possible, thereby limiting the shunting of the magnetic flux. It will be understood, of course, that the spider part 26' of the yoke 22 may be made of non-magnetic material, with the magnetic teeth or pins 21, constituting the cylindrical member 19, suitably secured thereto.

If a very great speed-reduction is necessary, this may be obtained either with a very large number of teeth, or by cascading the vernier system already described. As an example of a cascaded arrangement, Fig. 4 shows a stator core 30 suitably wound with a two-pole, two-phase winding 31 for producing, say, a clockwise field rotating at 3600 R. P. M. There are two rotor members,—an intermediate annular rotor core 32 disposed within the stator core 30 and separated therefrom by an air gap 33; and an inner rotor member 34 disposed within the intermediate annular member 32 and separated therefrom by an air gap 35.

As an example, the inner periphery of the stator core 30 is provided with one hundred eighteen teeth 36. The outer periphery of the intermediate core 32 is provided with one hundred twenty teeth 37. The inner periphery of the intermediate core 32 is provided with one hundred twenty-two teeth 38 and the inner rotor member 34 is provided with one hundred twenty teeth 39. With this arrangement, the speed of the intermediate annular member 32 will be $$\frac{120-118}{120} \times 3600 = 60 \text{ R. P. M.}$$

and the speed of the inner rotor 34 will be $$\frac{120-122}{120}(3600-60) + 60 = 1 \text{ R. P. M.}$$

It will be noted that the inner rotor 34 rotates backwardly with respect to the intermediate rotor, at one-sixtieth of the speed of the rotating flux in the intermediate rotor, and since the intermediate rotor is rotating forwardly at a speed of 60 R. P. M. with respect to the stator flux, the speed of rotation of the flux, with respect to the intermediate member is 3600−60=3540 R. P. M. Since the inner rotor member 34 rotates backwardly with respect to the intermediate member 32 at 59 R. P. M. and since the intermediate member rotates forwardly at 60 R. P. M., the actual rotation of the inner rotor 34 will, therefore, be one revolution per minute in the positive or forward direction. It is thus evident that the second hand of a clock can be directly connected to the inner rotor 34. The minute and hour hands may be geared to the rotor 34, either by ordinary gearing, or by vernier magnetic reduction gearing, as will be readily understood.

Figs. 5 and 6 show my invention as a means for driving the turn-table 41 of a phonograph. Thus the bottom of the turn-table carries the rotor member 42 of one of my vernier motors, having 92 teeth, thereby fixing the speed of rotation of the rotor member at $$\frac{2}{92} \text{ of } 3600 = 78.26 \text{ R. P. M.}$$

on a 60-cycle supply. The stator member 43 has a number of teeth which is less than the rotor teeth, the difference being equal to two times the number of pairs of stator poles. For a two-pole stator, the stator poles would be ninety. For a four-pole stator, as shown, the number of stator poles is eighty-eight.

Fig. 7 shows an embodiment of my invention in a shaded-pole single-phase motor having six stator poles, each divided into five pole pieces or teeth, making thirty stator teeth 45 in all. The rotor member 46 has thirty-six teeth 47, thus advancing the rotor member by six rotor teeth, or one-half of a revolution, for each complete rotation of the stator field, which requires three cycles because there are three pairs of stator teeth. The rotor, therefore, rotates synchronously at 200 R. P. M. on a 60-cycle supply. As shown by the broken-away portions in Fig. 7, about half of the stator teeth, or three teeth of each pole, are shaded by means of a shading ring 48, so as to produce the effect of a split-phase or rotating field, in a manner which is well known.

It is not possible to make the difference between the stator teeth and the rotor teeth less than the number of stator poles, because it is necessary to have tooth coincidence under both a north pole and a south pole simultaneously, so that there will be a good return path for the flux. It is possible to make the difference between the stator teeth and the rotor teeth an exact multiple of the stator teeth, but this would have the effect of proportionately reducing the speed-reduction, or proportionately increasing the speed of the low-speed rotor, so that there would normally be no object in using a difference which is larger than the number of stator poles.

When the number of rotor teeth exceeds the number of stator teeth, the progression of tooth-coincidence will be in the same direction as the rotation of the stator field, so that the motor will be readily self-starting by reason of hysteresis and eddy currents in the rotor member, either one of which may be increased at will, the former by choosing an iron or iron alloy having a large hysteresis loss or high remanence, and the later by utilizing a disk of conducting material or a squirrel-cage winding or the like. The starting torque of these forwardly rotating vernier motors may also be increased by increasing the effectiveness of the damping ring 48, in the split-pole motor shown in Fig. 7.

For vernier motors which rotate backwardly, self-starting can be obtained only by reducing the hysteresis and eddy-current torques to a minimum, because these torques are in opposition to the direction of progression of tooth-coincidences. In such motors, it is desirable to reduce the inertia of the rotor member to as low a value as possible and also to reduce its synchronous speed by increasing the number of rotor teeth, if self-starting characteristics are to be obtained. In general, my backwardly rotating vernier motors will not be self-starting.

In the case of my so-called magnetic reducing gear, in which a permanent magnet is rotated, self-starting is always easy, regardless of the direction of rotation, both because of the nature of the rotating field and because the slow-speed driven element of my magnetic reducing gear starts up at the same time as the rotating permanent magnet.

In general, my vernier motor will operate if a few of the teeth of either the stator member or the rotor member, or both, are missing. The only requirement is that the tooth pitch of the closely-spaced teeth shall be uniform and equal to 360°/T, where T is the number of teeth that the member would have if no teeth were missing. The operation is the same as if all T teeth were present, except for a slightly reduced torque.

In my cascaded motor, when it is necessary for the two speed-reductions to be in the same ratio, so that the intermediate rotor member 32 (Fig. 4) has more teeth on its inner periphery than its outer periphery, it is desirable to have as little iron as possible between these two sets of teeth, so that not much of the flux will flow circumferentially through the iron. If the inner and outer teeth are the same in number, no circumferentially extending iron need be used at all.

In my phonograph motor, whatever the frequency $f$ may be, the number of rotor teeth $T_r$ will always be an integral number such as to make the rotor speed approximately 78. Thus $$\frac{2}{T_r} \times (60f) = 78, \text{ approximately,}$$

$$\therefore T_r = \frac{20f}{13}, \text{ approximately.}$$

While I have shown my invention in several forms of embodiment, and have suggested several uses thereof, I desire it to be understood that my invention is not limited to such embodiments or uses. I desire, therefore, that the appended claims shall be accorded the broadest construction consistent with their language and the prior art.

I claim as my invention:

1. A vernier motor comprising magnetizable toothed stator and rotor members, and means for producing a rotating magnetic field therein, characterized by the tooth pitches of the stator and rotor members being different, and corresponding to total tooth numbers $T_s$ and $T_r$ for the stator and rotor, such that $360°/T_s$ and $360°/T_r$ are the stator and rotor tooth-pitches, in degrees, and $T_s - T_r = \pm np$, exactly, where $p$ is the number of poles of the rotating field, and $n$ is any small integer except zero, the actual numbers of stator and rotor teeth being both at least several times said difference $\pm (T_s - T_r)$.

2. The invention as set forth in claim 1, characterized by the spaces between any successive teeth being larger than a single air-gap between the rotor and stator members.

3. The invention as set forth in claim 1, characterized by the fact that the teeth of ly spaced and extend around the entire periphery.

4. A vernier motor comprising toothed stator and rotor members, each member having uniformly spaced magnetizable teeth extending around the entire periphery, and means for producing a rotating magnetic field, threading through coinciding stator- and rotor-member teeth, from one member to the other, and back again through other coinciding teeth, the coincidence of the flux-carrying teeth progressing slowly around the periphery, by vernier action, as the field rotates, characterized by the difference between the numbers of the stator teeth and the rotor teeth being exactly equal to $\pm np$, where $p$ is the number of poles of the rotating field, and $n$ is any small integer except zero, the numbers of stator and rotor teeth being both at least several times said difference.

5. The invention as set forth in claim 4, characterized by the spaces between successive teeth being larger than a single air-gap between the rotor and stator members.

6. A vernier motor comprising toothed stator and rotor members, each member having uniformly spaced magnetizable teeth extending around the entire periphery, and means for producing a rotating magnetic field, threading through coinciding stator- and rotor-member teeth, from one member to the other, and back again through other coinciding teeth, the coincidence of the flux-carrying teeth progressing slowly around the periphery, by vernier action, as the field rotates, characterized by the difference between the numbers of the stator teeth and the rotor teeth being exactly equal to $\pm p$, where $p$ is the number of poles of the rotating field, the numbers of stator and rotor teeth being both at least several times said difference.

7. The invention as set forth in claim 6, characterized by the spaces between successive teeth being larger than a single air-gap between the rotor and stator members.

8. A vernier motor comprising toothed stator and rotor members, each member having uniformly spaced magnetizable teeth extending around the entire periphery, and a winding on the stator member for producing a rotating magnetic field, when energized from a commercial frequency power circuit, said rotating magnetic field threading through coinciding stator- and rotor-member teeth, from one member to the other, and back again through other coinciding teeth, the coincidence of the flux-carrying teeth progressing slowly around the periphery, by vernier action, as the field rotates, characterized by the difference between the numbers of the stator teeth and the rotor teeth being exactly equal to $\pm p$, where $p$ is the number of poles of the rotating field, the numbers of stator and rotor teeth being both at least several times said difference.

9. A self-starting vernier motor comprising toothed stator and rotor members, each member having uniformly spaced magnetizable teeth extending around the entire periphery, and a winding on the stator member for producing a rotating magnetic field, when energized from a commercial-frequency power circuit, said rotating magnetic field threading through coinciding stator- and rotor-member teeth, from one member to the other, and back again through other coinciding teeth, the coincidence of the flux-carrying teeth progressing slowly around the periphery, by vernier action, as the field rotates, characterized by the difference between the numbers of the stator teeth and the rotor teeth being exactly equal to $\pm p$, where $p$ is the number of poles of the rotating field, the numbers of stator and rotor teeth being both at least several times said difference, the spaces between successive teeth being larger than a single air-gap between the rotor and stator members.

10. A vernier motor comprising toothed stator and rotor members, each member having uniformly spaced magnetizable teeth extending around the entire periphery, and a third member rotatably mounted concentrically in operative relation to said stator and rotor members, said third member being a salient-pole field member for producing a rotating magnetic field, when rotated, said rotating magnetic field threading through coinciding stator- and rotor-member teeth, from one member to the other, and back again through other coinciding teeth, the coincidence of the flux-carrying teeth progressing slowly around the periphery, by vernier action, as the field rotates, characterized by the difference between the numbers of the stator teeth and the rotor teeth being exactly equal to $\pm p$, where $p$ is the number of poles of the rotating field, the numbers of stator and rotor teeth being both at least several times said difference.

11. A vernier motor comprising toothed stator and rotor members, each member having uniformly spaced magnetizable teeth extending around the entire periphery, and a third member rotatably mounted concentrically in operative relation to said stator and rotor members, said third member being a salient-pole permanently-magnetized field member for producing a rotating magnetic field, when rotated, said rotating magnetic field threading through coinciding stator- and rotor-member teeth, from one member to the other, and back again through other coinciding teeth, the coincidence of the flux-carrying teeth progressing slowly around the periphery by vernier action, as the field rotates, characterized by the difference between the numbers of the stator teeth and the rotor teeth being exactly equal to $\pm p$, where $p$ is the number of poles of the rotating field, the numbers of stator and rotor teeth being both at least several times said difference.

12. A magnetic reducing gear comprising a double-airgap motor having a rotating magnet member, a stator member, and a low-speed rotor member, said three members being co-axial and separated by the two air-gaps, said stator member and said low-speed rotor member having a large number of magnetic teeth, the teeth of the member nearest said rotating magnet member being sufficiently well insulated magnetically from each other to be able to transmit a material portion of the flux on through to the other toothed member, the difference between the numbers of teeth in the two toothed members being equal to the number of poles of the field of the rotating magnet member.

13. A cascaded double-airgap vernier motor comprising a stator member having a large number of magnetizable teeth, means for producing a rotating magnetic flux to pass through successive teeth of said stator member, and two multitoothed rotor members operatively associated with said stator member, said three members being co-axial and separated by the two airgaps, the intermediate member being one of the rotor members and having inwardly and outwardly projecting magnetic teeth sufficiently well insulated magnetically from each other to be able to transmit a material portion of the flux on through to the other rotor member, the difference between the number of teeth on opposite sides of one airgap being $+p$, and the difference between the number of teeth on opposite sides of the other gap being $-p$, where $p$ is the number of poles of the rotating flux, the same being a relatively small number.

14. A self-starting vernier motor having a stator member wound for energization from a single-phase commercial-frequency source, means for producing a rotation of the field in said stator member, said stator winding being wound on a magnetizable core having a large number of teeth $T_s$, and a rotor member operatively associated with said stator member and connected to the turntable shaft underneath the turntable, said rotor member comprising a magnetizable core having a large number of teeth $T_r$, characterized by the fact that $T_r$ and $T_s$ are integral numbers such that $T_r = 20f/13$, approximately, and $T_s = T_r + p$, where $f$ is the frequency and $p$ is the number of stator poles.

15. A slow-speed synchronous motor operating on a commercial-frequency single-phase supply, comprising a magnetizable stator core having a large number of teeth uniformly distributed about its air-gap periphery, a magnetizable rotor core having a large number of teeth uniformly distributed about its air-gap periphery, and means for producing a two-pole magnetic field rotating in said stator member at full two-pole synchronous speed, the rotor member having two teeth less than the stator member.

16. A slow-speed synchronous motor operating on a commercial-frequency single-phase supply, comprising a magnetizable stator core having a large number of teeth uniformly distributed about its air-gap periphery, a magnetizable rotor core having a large number of teeth uniformly distributed about its air-gap periphery, and means for producing a two-pole magnetic field rotating in said stator member at full two-pole synchronous speed, the rotor member having two teeth more than the stator member.

17. A slow-speed synchronous clock motor operating on a commercial-frequency single-phase supply, comprising a magnetizable stator core having a large number of teeth uniformly distributed about its air-gap periphery, a magnetizable rotor core having a large number of teeth uniformly distributed about its air-gap periphery, and means for producing a two-pole magnetic field rotating in said stator member at full two-pole synchronous speed, the difference between the numbers of stator and rotor teeth being two.

In testimony whereof, I have hereunto subscribed my name this 15th day of July, 1931.

LEWIS W. CHUBB.

DISCLAIMER 1,894,979.—*Lewis W. Chubb*, Pittsburgh, Pa. VERNIER MOTOR. Patent dated January 24, 1933. Disclaimer filed August 3, 1934, by the assignee, *Westinghouse Electric & Manufacturing Company*.

Hereby disclaims from the scope of claims 1, 2, 3, 4, 5, 6, 7, 8, 9, and 17 any construction of motor in which the number of rotor teeth is more than the number of stator teeth, and hereby disclaims claim 16 which reads as follows:

"A slow-speed synchronous motor operating on a commercial-frequency single-phase supply, comprising a magnetizable stator core having a large number of teeth uniformly distributed about its air-gap periphery, a magnetizable rotor core having a large number of teeth uniformly distributed about its air-gap periphery, and means for producing a two-pole magnetic field rotating in said stator member at full two-pole synchronous speed, the rotor member having two teeth more than the stator member."

[*Official Gazette August 28, 1934.*]